Oct. 8, 1968 F. G. KRAL 3,404,894

RECORD CARD SHIFTING MECHANISM

Filed Oct. 17, 1966

INVENTOR.
Fred G. Kral.
BY 3,404,894

RECORD CARD SHIFTING MECHANISM

Fred G. Kral, Berwyn, Ill., assignor to Bell & Howell Company, Chicago, Ill., a corporation of Illinois
Filed Oct. 17, 1966, Ser. No. 587,127
6 Claims. (Cl. 274—4)

The present invention relates to a record translocation mechanism for vertical record cards of the general type which may carry magnetic media in a horizontal band used for recordal of sound indicia.

Particularly the invention relates to an adjustable vertical record card support which will enable a sensing head and the like to engage a vertical record card at various levels for operative treatment of selected of a plurality of levels in a horizontal band for sound indicia.

Translocation mechanisms with which the instant invention concerns itself provide a course or track adapted for advancement of a vertical record card from a course entrance to a course exit past a single station at which there is disposed an operative head which may be adapted for pick-up of magnetic sound indicia. For carrying sound indicia, each record card may comprise band means of magnetic media which extends longitudinally of the path of card movement.

Because vertical record cards are used for educational purposes, frequently for teaching languages by phonetics, it is desirable to provide band means of magnetic media and the like proportioned on each such record card for imposition of sound indicia of an instructor and a student, with corresponding indicia disposed in vertical alignment with each other and adjoining and in vertical alignment with corresponding written phonetic indicia. Thereby, sounds made by a student and his instructor can readily be compared with written indicia representing such sounds as a record card is played.

It is an object of the present invention to provide an improved translocation mechnaism for vertical record cards having a plurality of horizontal record levels whereby selected thereof can be moved in a longitudinal path into operative relationship with a sensing head or the like disposed at a relatively stationary level.

Another object of the invention is to provide in said translocation mechanism a vertical record card support rail defining parallel courses disposed at varying levels in a vertical record card path to vary the position of record card engagement with said head.

It is a further object of the invention to provide a tiered course in a translocation mechanism shiftably arranged to support a vertical record card at selected levels in a vertical plane to enable selective operative engagement at vertically spaced levels on said card with a sensing head and the like.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figures 1, 2, 3:
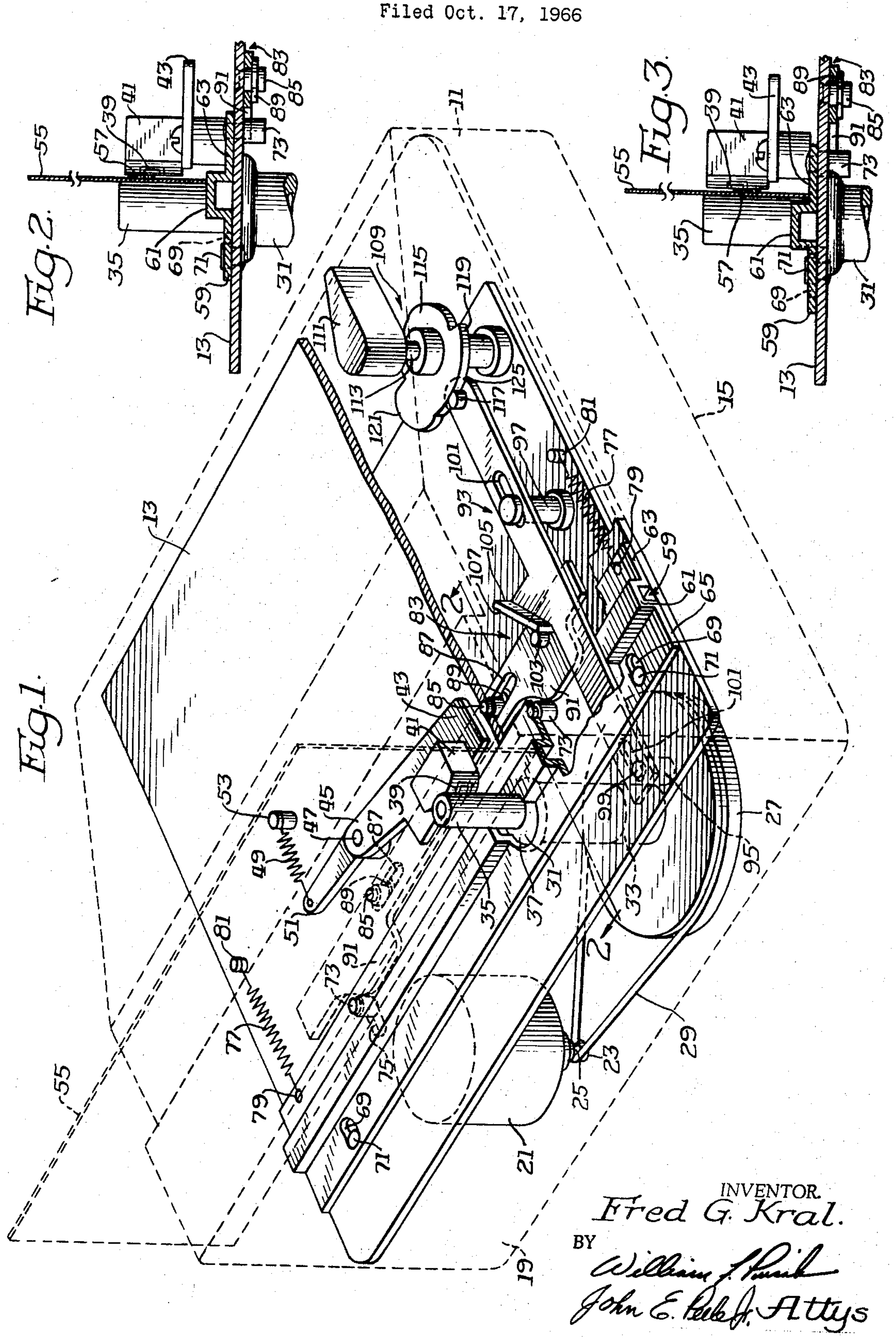
FIG. 1 is a perspective view of a record player embodying one form of the present invention, parts being shown dotted and parts broken away for the purpose of illustration.
FIG. 2 is a vertical sectional view taken substantially along the line 2—2 of FIG. 1 and looking in the direction of the arrows to illustrate one condition of a record card support rail of said embodiment.
FIG. 3 is a view substantially similar to FIG. 2, but showing another condition of said record card support rail.

Referring now more particularly to FIG. 1, a housing 11 of a record playing machine is shown in dotted lines. A flat horizontal deck 13 is suitably supported within the housing 11 in vertically spaced relationship with the housing base 15 to form a chamber 19 between said base and said deck. A motor 21 is suitably supported in the chamber 19 and, in the instant embodiment, has a downwardly extending motor drive shaft 23 which is peripherally grooved as at 25. A peripherally grooved fly wheel 27 which is disposed in a horizontal plane is journalled in the chamber 19 in operative alignment with the motor shaft 23. A pulley belt 29 frictionally engages in the groove 25 and the peripheral groove of the fly wheel 27, said belt being tensioned to transmit motive power from the motor to said fly wheel.

A vertically disposed spindle 31 is mounted in chamber 19 with its lower end 33 secured centrally of fly wheel 27. A capstan 35 which is vertically disposed above deck 13 projects axially upwardly from the upper end of spindle 33 through a deck opening 37. The capstan may be integral with spindle 33 for co-rotation with fly wheel 27.

An operative head 39, herein shown as a conventional magnetic pick-up head adapted to sense magnetically recorded indicia, is arranged in record card translocation association with said capstan. To that end, the head 39 is held in casing 41. The casing is rigidly secured to one end portion 43 of a pivoted horizontal arm 45 which is rockably supported above the deck 13. A pivot 47 is provided medially of the ends of arm 45 for rocking support thereof. A biasing spring 49 at one end connects to the other end portion 51 of arm 45, the other end of said spring 49 being secured by customary anchoring means 53, such as a pin, to the deck 13. Thereby head 39 is biased into record card gripping association with said capstan.

The capstan 35, when rotated and co-acting with head 39, serves as a transport mechanism for translocation of a vertical record card 55 in a horizontal path across the housing 11. The vertical record card 55 may carry on one flat customary magnetic media arranged in a band or strip 57. Band 57 is adapted for imposition at a plurality of vertical levels of indicia from which sound can be reproduced in a customary manner after sensing by head 39. The record card is proportioned to be frictionally driven longitudinally of said band 57 by co-action of capstan 35 and head 39; and, accordingly, if said record card is arranged with its band 57 engaging head 39, said record will be played as it is driven.

A horizontally disposed record card support rail 59 defines an elongated record card path or course transversely of housing 11. As fashioned in the present embodiment, rail 59 is shiftably arranged upon the upper surface of the deck 13 and comprises a medial card support tier or track 61 which is elevated from the deck 13, a flange which defines an outer card support track or tier 63 which is slidable along the deck 13, and a mounting flange 65 which is disposed in the plane of tier 63. The tiers 61 and 63 and the flange 65 are co-extensive with rail 59 and are disposed in parallel relationship with each other. The rail parts are arranged and proportioned so that said record card can be supported on either of tiers 61 and 63 in operative association with the capstan 35 and the head 39.

The direction of rail shiftability is normal to the course of the record card and said shiftability is limited by a pair of horizontally spaced apart slots or apertures 69 formed in flange 65. Moreover, opening 37 is proportioned to facilitate shifting of said rail. A pair of bosses 71 projecting upwardly from deck 13 engage in the apertures 69 and are proportioned to permit and control the magnitude of shifting of rail 59. Further facilitating the proper shifting of the rail 59 is a pair of downwardly extending bosses 73. Said bosses 73 are secured, by any suitable means, to the tier 63 in spaced apart relationship longitudinally thereof and engage respective guide slots 75 fashioned in the deck 13. Only one of said guide slots is seen in FIG. 1.

As fashioned, a pair of spaced-apart tension springs 77 normally bias the rail 59 so that the tier 61 is in record card support position. To that end, one end of each of said springs is connected to said rail as at 79 and an opposite end is anchored on a permanent member as at 81. A shift arm generally designated 83 is adapted for moving the rail 59 against the action of the springs 77 from a position in which the track 61 is adapted for record card support (FIGS. 1 and 2) to a position in which the track 63 is adapted for record support (FIG. 3). Said shift arm 83 extends and is arranged for sliding longitudinally of the rail 59 against the lower surface of the deck 13 as illustrated in FIGS. 2 and 3.

To facilitate operative movement of said shift arm, a pair of pins or lugs 85 has its upper end portions secured to the deck 13 in spaced apart positions longitudinally of said shift arm. The pins or lugs 85 project through a pair of guide slots 87 which are fashioned in said shift arm. Said guide slots are elongated longitudinally of said last mentioned arm and are proportioned for sliding fit with said pins 85 to limit longitudinal movement of said shift arm. To hold said shift arm against the lower face of the deck 13, two flat anti-friction bearing retainers 89 are secured on the lugs 85, respectively, with the upper faces thereof arranged for sliding engagement with the lower face of said shift arm.

The shift arm 83 has a pair of integral throw or cam extensions 91 which are spaced apart longitudinally of the rail 59. Said throw extensions 91 are proportioned in such a manner that, upon sliding of said shift arm in one direction (to the left with respect to FIG. 1), the throw extensions will force the rail 59 from its normal position (FIGS. 1 and 2) to the position of FIG. 3 by pushing against the bosses 73 thereby to position the tier 63 in record card support position. Upon reverse sliding of said shift arm, back to the condition of FIG. 1, said throw extensions will clear the bosses 73 and thereby permit the rail 59 to return to its normal position under the biasing action of the springs 77.

A control arm generally designated 93 is employed for selective conditioning of the shift arm 83. As fashioned, the control arm is disposed above the deck 13 with its longitudinal axis normal to the longitudinal axis of said shift arm. The control arm may be supported on a pair of pins or uprights 95 and 97 which have upper portions 99 which slidingly engage in slots 101 formed in said control arm. The slots 101 are proportioned to permit movement of the control arm 93 longitudinally of its axis a sufficient distance for desired management of said shift arm.

The shift arm 83 carries a vertical pin or cylindrical lug 103 (FIG. 1) which extends above the deck 13. The control member 93 carries a vertical boss 105 having a flat 107 which slideably bears against the lug 103. The flat 107 is angularly disposed relative to the longitudinal axes of the shift arm and the control arm. In the illustrated embodiment, the direction of the slope is such that when the control arm 93 is moved downwardly and to the left with respect to FIG. 1, the throw extensions 91 will force the rail 59 to the position of FIG. 3. When the force holding said control arm 93 to condition the parts as shown in FIG. 3 is released, the biasing action of the springs 77 will return the parts to the condition shown in FIG. 1.

For operating said control arm, a manually operable function selector mechanism generally designated 109, is provided. Said function selector mechanism comprises a manually operable knob 111 which is secured to the upper end portion of a small vertical shaft 113. The latter is suitably journalled by any conventional means for selective rotation by knob 111 adjacent a proximal end portion 125 of control arm 93. A cam 115 is co-rotationally secured on the shaft 113. Said cam is disposed at a level for peripheral engagement with an upwardly extending pin or lug 117 which is rigidly carried on the cam proximate end portion 125 of said control arm. As fashioned, the cam has an arcuate peripheral dwell 119 and an arcuate peripheral throw 121, the throw being of greater eccentric disposition than the former. Moreover, said throw is proportioned so that it can be rotated to force said control arm downwardly and to the left with respect to FIG. 1 to shift the rail 59 to the position of FIG. 3 against the action of springs 77. Furthermore, the dwell is proportioned so that when it is aligned for operable association with the lug 117, the rail 59 will be disposed as illustrated in FIGS. 1 and 2, under the action of springs 77.

With the illustrated embodiment of the invention, sound indicia recorded along the magnetic record band 57 at either of a pair of vertical levels can be selectively held in pick-up alignment with the head 39 by supporting a record card on a corresponding of tiers 61 and 63. However, in accordance with the present teachings and within the scope thereof, more than a pair of tiers may be provided so that a record card can be supported for recording or play at more than two vertical levels.

As many substitutions or changes could be made in the above described construction and as many apparently widely different embodiments of the invention could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a record machine adapted for vertical record cards of the type having a horizontal media strip for recordal of sound indicia and adapted for translocation in a lineal path, the combination of sensing means arranged at a relative fixed station along the path of travel of a record card for indicia transfer, driving means for advancing a record card along a path to carry its media strip into and out of engagement with said sensing means, with multi-level track means arranged to support a record card for translocation into and out of operative association with said sensing means, and shifting means to condition said track means with selected of its levels in record card support disposition whereby the relative position of engagement of said sensing means and the media strip of a record card can be selectively varied.

2. A record machine as defined in claim 1 in which the multi-level track means comprises a shiftable horizontal rail defining a path for a record card and having a plurality of tiers of varying vertical levels extending longitudinally of said track means.

3. A record machine as defined in claim 1 in which the shifting means comprises a first arm arranged for movement in a horizontal plane, a second arm arranged for movement by said first arm in a horizontal plane and normal to the path of movement of said first arm, and cam means arranged for motivation by said second arm for shifting said track means in a path normal to the path of movement of said second arm.

4. A record machine as defined in claim 3 further characterized by a boss carried by said first arm; a pin carried by said second arm in spring biased abutment with said boss; means for shifting said first arm in opposite directions normally to the path of a record card, said boss being angularly disposed and proportioned in such a manner that as said first arm moves in opposite directions the position of abutment with said pin shifts normally to the path of movement of said first arm to cause said second arm to shift.

5. A record machine as defined in claim 1 in which said track means is spring biased and arranged for shifting movement in a direction normal to the record card path and includes a lug, said track shifting means comprising an arm arranged for movement in opposite directions in a path parallel to the record card path and having a track throw extension arranged to engage said lug for shifting said track at selected conditions of said arm.

6. A record machine as defined in claim 4 in which the cam means comprises a pair of throw projections extending from and spaced longitudinally of said second arm; a pair of lugs secured to and spaced longitudinally of said track means, said lugs proportioned for engagement by said throw projections upon selected shifting of said second arm to correspondingly condition said track means for record card support at a selected level.

References Cited

UNITED STATES PATENTS

| | | | |
|---|---|---|---|
| 3,348,320 | 10/1967 | Brokaw | 35—35 |
| 2,849,542 | 8/1958 | Mac Chesney | 179—100.2 |
| 2,677,200 | | Mac Chesney | 35—35 |

LEONARD FORMAN, *Primary Examiner.*

FELIX J. D'AMBROSIO, *Assistant Examiner.*